(12) United States Patent
Rehborn et al.

(10) Patent No.: US 11,854,006 B2
(45) Date of Patent: Dec. 26, 2023

(54) METHOD FOR PAYING IN A MOTOR VEHICLE BY MEANS OF A TRANSACTION ON A CRYPTOCURRENCY COMPUTER NETWORK

(71) Applicant: DAIMLER AG, Stuttgart (DE)

(72) Inventors: Hubert Rehborn, Sindelfingen (DE); Frank Starman, Boeblingen (DE); Micha Koller, Pliezhausen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 267 days.

(21) Appl. No.: 17/295,664

(22) PCT Filed: Nov. 5, 2019

(86) PCT No.: PCT/EP2019/080213
§ 371 (c)(1),
(2) Date: May 20, 2021

(87) PCT Pub. No.: WO2020/104184
PCT Pub. Date: May 28, 2020

(65) Prior Publication Data
US 2022/0012728 A1    Jan. 13, 2022

(30) Foreign Application Priority Data

Nov. 21, 2018  (DE) ............... 10 2018 009 168.7

(51) Int. Cl.
*G06Q 20/38*        (2012.01)
*B60R 16/023*      (2006.01)
(Continued)

(52) U.S. Cl.
CPC ........... *G06Q 20/389* (2013.01); *B60K 35/00* (2013.01); *B60R 16/0231* (2013.01);
(Continued)

(58) Field of Classification Search
CPC ............ G06Q 20/389; G06Q 20/3272; G06Q 20/3276; G06Q 20/3674; G06Q 20/3829; B60K 35/00
(Continued)

(56) References Cited

U.S. PATENT DOCUMENTS 10,504,094 B1 * 12/2019 Gaudin ................. G07F 15/001
10,803,432 B1 * 10/2020 Miles ..................... G06Q 20/14
(Continued)

FOREIGN PATENT DOCUMENTS

DE    102012206770 A1    11/2013
DE    102013114935 A1     7/2015
(Continued)

OTHER PUBLICATIONS

Office Action dated May 17, 2022 in related/corresponding JP Application No. 2021-526480.
(Continued)

*Primary Examiner* — Courtney P Jones
(74) *Attorney, Agent, or Firm* — PATENT PORTFOLIO BUILDERS PLLC

(57) ABSTRACT

A method for paying in a motor vehicle having a transaction device involves providing transaction data relating to the payment to the payment transmitter. The transaction data including a receiver address of a payment receiver, a payment amount, a transmitter address of a payment transmitter located in the motor vehicle, and a private key belonging to the transmitter address. The provided transaction data is entered into the transaction device. The entered receiver address is transmitted to the payment receiver, which authenticates the transmitted receiver address. Only if the authenticated receiver address is classified as authentic does the method proceed. This involves signaling the successful authentication of the receiver address to the payment trans-
(Continued)

mitter and transmitting the entered transaction data entered to the cryptocurrency computer network for carrying out the payment. Accordingly, a transaction compiled from the transaction data is entered into at least one account book of the cryptocurrency computer network. A transaction status relating to the entry of the transaction is signaled to the payment transmitter.

18 Claims, 1 Drawing Sheet

(51) Int. Cl.
    *G06Q 20/32*     (2012.01)
    *G06Q 20/36*     (2012.01)
    *B60K 35/00*     (2006.01)
    *G06F 16/23*     (2019.01)

(52) U.S. Cl.
    CPC ..... *G06Q 20/3272* (2013.01); *G06Q 20/3276* (2013.01); *G06Q 20/3674* (2013.01); *G06Q 20/3829* (2013.01); *B60K 2370/16* (2019.05); *G06F 16/2379* (2019.01)

(58) Field of Classification Search
    USPC .......................................................... 705/67
    See application file for complete search history.

(56) References Cited

U.S. PATENT DOCUMENTS

| | | | |
|---|---|---|---|
| 11,257,065 B1* | 2/2022 | Ghosh | G07F 9/001 |
| 2016/0086418 A1 | 3/2016 | Smolen et al. | |
| 2017/0178417 A1 | 6/2017 | Bekas et al. | |
| 2019/0220861 A1* | 7/2019 | Silver | H04L 9/3239 |
| 2019/0378220 A1* | 12/2019 | Ibrahim | G06Q 20/18 |
| 2020/0013026 A1* | 1/2020 | Noonan | G06Q 20/38215 |
| 2020/0013047 A1* | 1/2020 | Weissenmayer | G06Q 20/36 |
| 2021/0273819 A1* | 9/2021 | Rueckriemen | H04L 9/3268 |

FOREIGN PATENT DOCUMENTS

| | | | |
|---|---|---|---|
| DE | 102016206916 A1 | 10/2017 | |
| JP | 2004094926 A | 3/2004 | |
| JP | 2014055023 A | 3/2014 | |
| JP | 2016068974 A | 5/2016 | |
| JP | 2019218108 A | 12/2019 | |
| JP | 2019218110 A | 12/2019 | |
| WO | 2018113572 A1 | 6/2018 | |
| WO | WO-2018203660 A1 * | 11/2018 | G06Q 10/10 |

OTHER PUBLICATIONS

BlockchainFirst; "The first Multipurpose Blockchain enabled EV Charging Station;" Jan. 18, 2017; pp. 1-11.
International Search Report dated Dec. 17, 2019 in related/corresponding International Application No. PCT/EP2019/080213.
Office Action dated Apr. 28, 2021 in related/corresponding DE Application No. 10 2018 009 168.7.
Franco; "Understanding Bitcoin: Cryptography, Engineering and Economics;" 2015; Wiley; United Kingdom.
Written Opinion dated Dec. 17, 2019 in related/corresponding International Application No. PCT/EP2019/080213.
Office Action dated Jun. 6, 2023 in related/corresponding JP Application No. 2021-526480.

* cited by examiner

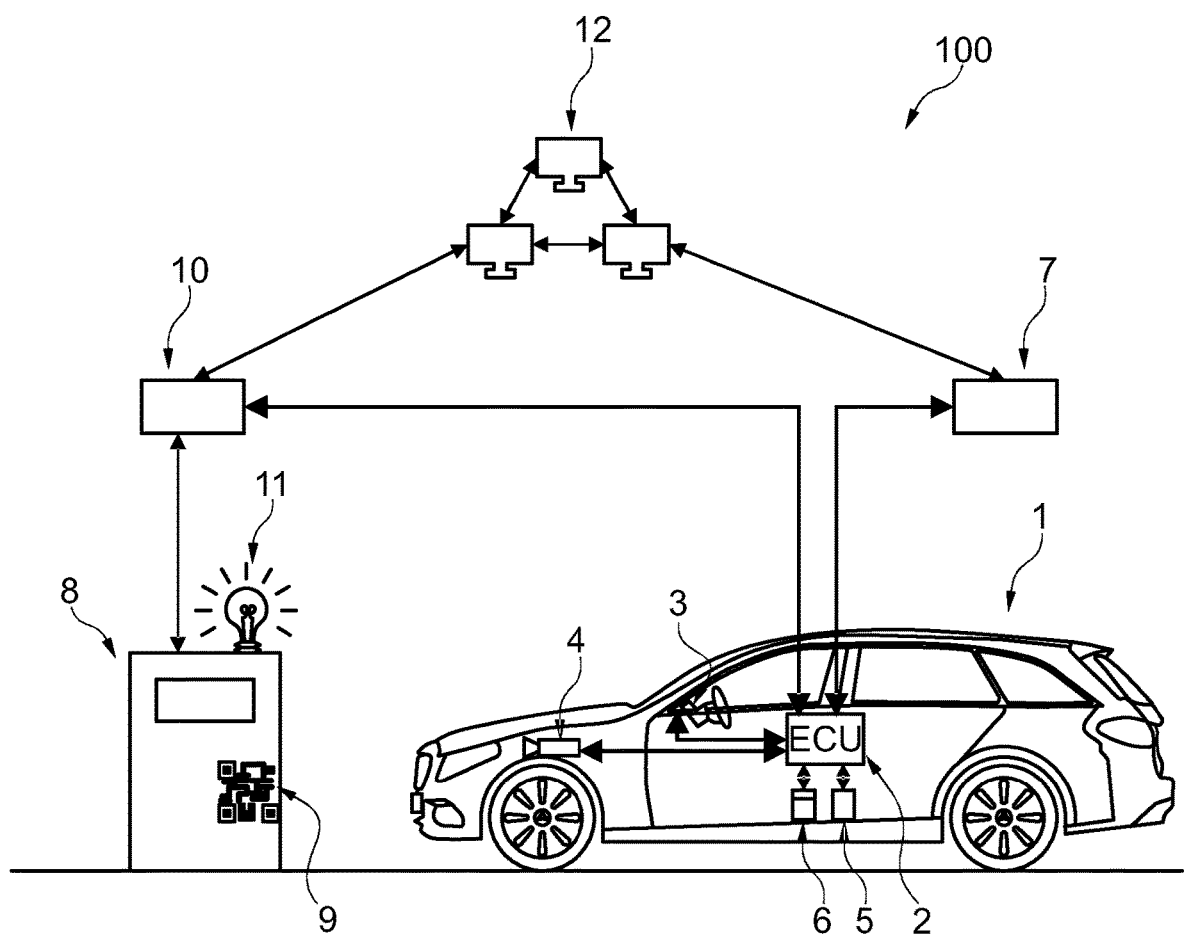

METHOD FOR PAYING IN A MOTOR VEHICLE BY MEANS OF A TRANSACTION ON A CRYPTOCURRENCY COMPUTER NETWORK

BACKGROUND AND SUMMARY OF THE INVENTION

Exemplary embodiments of the invention relate to a method for paying in a motor vehicle by means of a transaction on a cryptocurrency computer network. Exemplary embodiments of the invention further relate to a motor vehicle, which is designed to carry out this method.

Methods for paying in a vehicle are known from DE 10 2012 206 770 A1 and DE 10 2013 114 935 A1. Here, payment information stored in the motor vehicle is changed or identification information is transmitted.

However, conventional payment methods in a motor vehicle typically result in long waiting times before a payment process is completed or confirmed or even before goods or services purchased are obtained. Since the actual payment is here often only processed retrospectively, in particular for several payment processes together, insufficient liquidity can result in a payment not being able to be afforded. In addition, cases of fraud can result from forging a fake identity or from unauthorized reading or even manipulation of payment information.

Moreover, conventional payment methods in a motor vehicle require the conclusion of a contract with a goods or services provider, for example, already before the payment process.

Thus, exemplary embodiments of the present invention are directed to an alternative or improved method for payment in a motor vehicle, in which the disadvantages described above are dispelled at least partially, ideally completely. In particular, a method is to be created which implements a quicker, more reliable, more comfortable, and more secure payment by a user in a motor vehicle.

Accordingly, the base idea of the invention is to pay in a motor vehicle by means of a transaction on a cryptocurrency computer network. Here, a receiver address is transmitted to a payment receiver for checking its authenticity. If the receiver address is authentic, the successful authentication is displayed to a payment transmitter located in a vehicle.

Using the method according to the invention proposed here, payment can be made without cash in a particularly secure, fast, and comfortable manner. In particular, it is not necessary to leave the motor vehicle for the payment process. A previous registration with a goods or services provider who provides the service to be purchased is also not necessary. Typical payment processes, in which the method presented here has proved to be particularly advantageous, relate, in particular, to parking, cleaning or refueling of the motor vehicle for which payment is required and passing a blockade, such as a barrier, for which payment is required.

The method according to the invention serves for payment in a motor vehicle by means of a transaction on a cryptocurrency computer network. According to the method, a receiver address transmitted to a payment receiver is authenticated. Only if the authenticated receiver address is classified as authentic by the payment receiver is the following step carried out: the successful authentication of the receiver address is displayed to a payment transmitter located in the motor vehicle.

Preferably, the successful authentication of the receiver address is optically and, alternatively or additionally, acoustically displayed to the payment transmitter located in the motor vehicle, in particular by means of a display device arranged in the motor vehicle.

According to a particularly preferred embodiment, the method comprises the following steps:

Transaction data relating to the payment and comprising the receiver address is provided to the payment transmitter located in the motor vehicle in a first method step. Then, in a second method step, a receiver address transmitted to a payment receiver is authenticated. Only if the authenticated receiver address is classified as authentic by the payment receiver are the following method steps carried out: in a third method step, the successful authentication of the receiver address is displayed to a payment transmitter located in the motor vehicle, and in a fourth method step, the transaction data is transmitted to the cryptocurrency computer network for carrying out the payment. The embodiment described above has its own inventive character.

According to a preferred embodiment, the provided transaction data additionally comprises a payment amount and, alternatively or additionally, a transmitter address and a private key belonging to the transmitter address.

Expediently, the method additionally comprises a further step according to which the provided transaction data is at least partially entered into a transaction device present in the motor vehicle.

Advantageously, the transaction data is entered at least partially automatically, i.e., without prompting by the payment transmitter, in particular wirelessly. Alternatively, or additionally, the transaction data is at least partially entered by the payment transmitter by means of an input device of the motor vehicle connected to the transaction device. Alternatively, or additionally, the transaction data is at least partially entered by means of scanning in a QR code representation via an image capturing device connected to the transaction device, wherein the image capturing device is arranged on the motor vehicle and, alternatively or additionally, is arranged on a mobile device connected to the image capturing device. This embodiment respectively allows a particularly quick and particularly comfortable payment by the user located in the motor vehicle.

Particularly advantageously, the transaction data entered is at least partially stored in a database connected to the transaction device. Alternatively, or additionally, the transaction data entered is at least partially stored on a removable storage device connected to the transaction device, in particular on a hardware wallet. Alternatively, or additionally, the transaction data entered is stored at least partially on at least one backend server connected to the transaction device. By means of this embodiment, in each case one input of the transaction data provided can be made at least partially redundant, and a particularly quick and particularly comfortable payment in a motor vehicle can be obtained.

Expediently, the private key can be stored in a protected manner in such a way that it can be recognized by only the payment transmitter. In this way, it is possible for only the payment transmitter to actually carry out payment processes. Transactions by unauthorized third parties are prevented in this way.

Particularly expediently, the transaction data entered is at least partially transmitted starting from the database to the cryptocurrency computer network. Alternatively, or additionally, the transaction data entered is at least partially transmitted starting from the removable storage device, in particular from the hardware wallet, to the cryptocurrency computer network. Alternatively, or additionally, the transaction data entered is at least partially transmitted starting from the at least one backend server to the cryptocurrency computer network. An input of the transaction data provided can also be made at least partially redundant by means of these embodiments, and a particularly quick, secure, and comfortable payment can be achieved in a motor vehicle. Moreover, an already authorized receiver address can be used for payment.

Expediently, the method additionally comprises a further step, namely entering a transaction compiled from the transaction data into at least one account book of the cryptocurrency computer network.

Particularly advantageously, the method additionally comprises another additional method step, according to which transmitting a transaction status relating to entering the transaction to the payment transmitter located in the motor vehicle is carried out.

Preferably, the presence of a concluded payment is transmitted to the payment transmitter as the transaction status of the entry of the transaction as soon as at least one single confirmation, preferably at least three confirmations, most preferably at least six confirmations, of the cryptocurrency computer network are present.

Alternatively, or additionally, the transaction status of the entry of the transaction is transmitted to the payment transmitter as early as one second, preferably as early as one minute, most preferably as early as ten minutes after the start of the transfer of the transaction data to the cryptocurrency computer network as a concluded payment.

The invention further relates to a motor vehicle. The motor vehicle comprises a transaction device, wherein the motor vehicle or the transaction device is set up/programmed to carry out the method. The advantages of the method according to the invention explained above are thus also transferred to the motor vehicle according to the invention.

According to a preferred development of the motor vehicle, the motor vehicle comprises a database for storing transaction data and, alternatively or additionally, an input device for entering transaction data and, alternatively or additionally, an image capturing device arranged on the motor vehicle for entering transaction data. Such a motor vehicle has proved particularly suitable for a quick and comfortable payment by means of a transaction on a cryptocurrency computer network.

Further important features and advantages of the invention emerge from the dependent claims, from the drawing and from the corresponding description of the figures by means of the drawing.

BRIEF DESCRIPTION OF THE DRAWING FIGURES

A preferred exemplary embodiment of the invention is depicted in FIG. 1, which illustrates an exemplary motor vehicle payment system for a motor vehicle, and is explained in more detail in the description below.

It is understood that the features mentioned above and still to be explained in more detail below can be used not only in the respectively specified combination, but also in other combinations or on their own without leaving the scope of the present invention.

DETAILED DESCRIPTION

FIG. 1 illustrates an example of a motor vehicle payment system 100 for a motor vehicle 1 according to the invention. For this, the motor vehicle 1 comprises a transaction device 2. The transaction device 2 is set up or programmed to carry out the method according to the invention. Furthermore, an input device 3 connected to the transaction device 2 is arranged in the interior chamber of the motor vehicle 1, by means of which input device transaction data relating to a payment can be entered into the transaction device 2 by a payment transmitter—typically by the driver of the motor vehicle 1. The input device 3 can here comprise, for example, a touch-sensitive screen or a keyboard, which are installed as standard in the motor vehicle. It is also conceivable that a display device (not shown in FIG. 1) is arranged in the interior space of the motor vehicle 1, for example for displaying a receiver address to be authenticated or stored or an identifier belonging to the receiver address. The display device can also already be installed as standard in the motor vehicle 1—for example as part of a navigation system.

In the example of FIG. 1, an image capturing device 4 connected to the transaction device 2 is also arranged on the motor vehicle 1, by means of which image capturing device at least one part of the transaction data can be recorded by scanning in a QR code representation 9 and transmitted to the transaction device 2. Alternatively, to the image capturing device 4 installed in the motor vehicle 1, the use of an image capturing device integrated in a mobile telephone is also conceivable. The image capturing device 4 can be designed as a conventional camera. The motor vehicle 1 can also comprise a receiving and transmitting device (not shown in FIG. 1) connected to the transaction device 2, by means of which the transaction data can be provided automatically without prompting by the payment transmitter, in particular wirelessly, of the transaction device 2.

As depicted in the example of FIG. 1, the motor vehicle 1 moreover has a database 5 connected to the transaction device 2, in order to store the transaction data entered. It is also conceivable that the transaction data, in particular a private key belonging to a transmitter address, is stored on a removable storage device 6 connected to the transaction data 2, for example a so-called "hardware wallet" for a cryptocurrency, or on a backend server 7 connected to the transaction device 2. Such a backend server must then be set up to store and to evaluate information about executions of the method according to the invention and transaction data. The motor vehicle payment system 100 moreover comprises a payment transmitter device 8.

In the example of FIG. 1, a so-called QR code representation 9 of the receiver address is present on the payment receiver device 8. In addition, the motor vehicle payment system 100 comprises a central evaluation unit 10 of the payment receiver, to which the receiver address entered can be transmitted by means of a mobile internet connection for authentication. In one variant, the receiver address entered can be transmitted to a vicinity evaluation unit (not shown in FIG. 1) of the payment receiver by means of a vicinity radio, which vicinity evaluation unit is comprised by the payment receiver device 8. In the example of FIG. 1, the central evaluation unit 10 is in communicative connection with the vicinity evaluation unit and the transaction device 2.

Moreover, the payment receiver device 8 comprises a signaling device 11, by means of which the authenticity of the receiver address can be displayed to the payment transmitter located in the motor vehicle 1 by the payment receiver. The signaling device 11 can generate optical, acoustic, or haptic signals, for example. The motor vehicle payment system 100 further comprises a cryptocurrency computer network 12, which can have several computers, to which the transaction data entered can be transmitted. In the exemplary scenario of FIG. 1, three computers communicating with one another on the cryptocurrency computer network 12 are shown for the sake of clarity. The vicinity evaluation unit of the payment receiver device 8, the central evaluation unit 10, the transaction device 2, and the one backend server 7 communicate with the cryptocurrency computer network 12. In the example of FIG. 1, both the central evaluation unit 10 and the backend server 7 are directly connected to the cryptocurrency computer network.

The method according to the invention is explained below by way of example:

According to the method, transaction data is provided to a driver of the motor vehicle located in the motor vehicle 1. The transaction data contains a receiver address of a petrol station operator, at which the motor vehicle 1 has just been refueled for which payment is required. The transaction data required for the payment of the refueling process comprises a payment amount, which corresponds to the purchasing price raised by the petrol station operator for refueling, a transmitter address of the driver and a private key of the driver belonging to the transmitter address. The receiver address and the payment amount are here provided by the petrol station operator, to whom, in turn, the receiver address is provided by the cryptocurrency computer network. The transmitter address of the driver and the corresponding key are also provided to the driver by the cryptocurrency computer network.

The transaction data can here be provided, for example, as acoustic or optical information, as text, a numerical sequence, QR code representation, in digitally stored form or as a digital signal. In one variant of the example, it is conceivable that even a plurality of receiver addresses, transmitter addresses, payment amounts, or private keys is provided. It is also conceivable that receiver addresses, transmitter addresses, and private keys are provided by several cryptocurrency computer networks.

The transaction data provided is entered into the transaction device 2 in the course of the method according to the invention. To do so, the payment amount can be entered by the driver using the input device 3 and provided via this to the transaction device 2. The receiver address can be provided to the transaction device 2 for example by means of scanning in the QR code representation 9 using the image capturing device 4. The image capturing device 4 in the form of a camera can be arranged on the motor vehicle 1 itself or alternatively also arranged on a mobile telephone connected to the transaction device 2. In one variant of the example, the receiver address and the payment amount can be transmitted automatically—i.e., without manual input or prompting by the driver—and wirelessly—for example by means of Bluetooth—from the petrol station operator to the transaction device 2 of the motor vehicle 1.

The receiver address is then stored on the database 5 connected to the transaction device 2. The private key is here stored on the removable storage device 6. In an alternative variant, the private key can also be stored on the backend server 7. In both variants mentioned above, the private key is here stored in a protected manner in such a way that it can be recognized by only the payment transmitter.

The entered receiver address is then transmitted to a central evaluation unit 10 of the petrol station operator by means of a mobile internet connection for authentication. In an alternative variant, the receiver address entered is transmitted to a vicinity evaluation unit of the petrol station operator by means of vicinity radio.

If a stored receiver address has already been authenticated, it can also be transmitted directly to the cryptocurrency computer network 12 without re-authentication. For example, a stored receiver address can be displayed to the driver in a display device of the motor vehicle 1 and selected by them using the input device 3, whereupon it is transmitted directly to the cryptocurrency computer network 12 without repeated authentication.

If the receiver address is not classified as authentic, the abortive authentication is displayed to the driver and the payment process is aborted.

Only if the authenticated receiver address is classified as authentic is the method or the payment process continued. In this case, the petrol station operator displays the successfully checked authenticity of the receiver address to the driver located in the motor vehicle 1. The successfully checked authenticity of the receiver address can be displayed to the payment transmitter for example by means of a display device arranged in the motor vehicle. The transaction data entered is then transmitted to the cryptocurrency computer network 12. Here, the payment amount, the receiver address and the transmitter address of the petrol station operator are transmitted to the cryptocurrency computer network 12 starting from the transaction device 2.

Subsequently, the transaction compiled from the transaction data is entered into at least one account book of the cryptocurrency computer network 12. Here, the transaction can be digitally signed by the private key of the payment transmitter by means of an asymmetric cryptographic method. The private key of the payment transmitter, which is stored on the removable storage device 6, in particular on a hardware wallet, or the backend server 7, is here transmitted from the removable storage device 6 or from the backend server 7. The payment amount is transferred in the currency used by the cryptocurrency computer network from the account linked to the transmitter address to the account linked to the receiver address.

The account book used by the cryptocurrency computer network 12 can be, for example, a so-called "blockchain" of the bitcoin network. A transaction is then entered into a so-called "block" of the blockchain, and the block created in this way is transmitted to other account points—the so-called "nodes"—of the bitcoin network. It is also conceivable that the at least one account book of the cryptocurrency computer network 12 is so-called "Directed Acyclic Graphs", such as the "block lattice" of a so-called nano-network or the "tangle" of a so-called iota-network. With the nano-network, in each case one transaction would be entered into a block of the block chain of the driver or the petrol station operator, wherein the respective balance is stored in the block lattice.

Finally, a transaction status relating to the entry of the transaction is transmitted to the driver located in the motor vehicle as part of the method, the status containing the number of confirmations determined in advance successfully carried out on the cryptocurrency network 12:

An entry carried out is here transmitted from one "node" to other "nodes" of the cryptocurrency network 12, for example with the aid of a so-called "flooding" algorithm. If one of these other nodes of the cryptocurrency network 12 does not undertake the entry, the transaction is not present in the account book further distributed by this node, it is thus not confirmed. If a node of the cryptocurrency network 12 undertakes the entry, the transaction is again present in the account book further distributed by this node.

If the account book that undertakes the entry of the transaction has the highest number of entries, for example the longest "blockchain" or "block lattice", this account book is classified as preferred by the node clients of the cryptocurrency network 12 and is distributed further. The entry carried out is confirmed de-centrally, and this results in so-called "consensus". If the account book that undertakes the entry is continued with new entries or blocks and a "consensus" is once again achieved, the entry made previously is deemed to have been repeatedly confirmed. In the nano-network, the consensus is again achieved by means of balancing by means of "delegated point of stake", i.e., by a delegate chosen by the nano-currency owner.

The number of confirmations carried out is thus communicated to the driver as the transaction status of the entry. A payment process can thus be signaled as concluded, for example from one, three, or six confirmations of the cryptocurrency network 12. In another variant, the transaction status of the entry of the transaction is transmitted to the payment transmitter as early as one second, preferably as early as one minute, after the start of the transfer of the transaction data to the cryptocurrency computer network as a concluded payment.

The higher the number of confirmations, the more unlikely it is that an entry is revoked or amended by at least one node of the cryptocurrency network 12. Such an influence of an entry would, for example, require a similarly increasing amount of computational power of the bitcoin network or would have to be carried out by at least 51% of the delegates of the nano-network.

The transaction status of the entry of the transaction, a present authenticity or a non-present authenticity are signaled to the driver as part of carrying out the method by means of the signaling device 11 or with the aid of a display device present in the motor vehicle. Here, an identifier of the petrol station operator can also be transmitted.

Information for identifying the motor vehicle 1 or the driver located in the motor vehicle, such as a number plate, for example, and a corresponding transmitter address can be stored in the central transaction device 10 or the vicinity evaluation device of the petrol station for allocating a payment to a motor vehicle 1. If a payment process is concluded with a transmitter address, the motor vehicle 1 can drive out of the petrol station.

The backend server 7 stores information about executions of the method and transaction data as part of carrying out the method, in order to be able to evaluate these as necessary.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for making a payment in a motor vehicle using a transaction on a cryptocurrency computer network, the method comprising:

receiving, by the motor vehicle, a receiver address of a payment receiver;

storing the receiver address in a database of the motor vehicle;

determining, by the motor vehicle, whether the receiver address stored in the database has been previously authenticated, wherein when the receiver address stored in the database has been previously authenticated, the motor vehicle transmits the receiver address and transaction data to the cryptocurrency computer network without re-authentication, wherein the transaction data relates to the payment;

wherein when the receiver address stored in the database has not been previously authenticated, the method further comprising a) authenticating, by the motor vehicle with a central evaluation unit of the payment receiver external to the motor vehicle or a vicinity evaluation unit of the payment receiver external to the motor vehicle, the receiver address, wherein the authentication of the receiver address is a successful authentication if the receiver address is classified as authentic by the payment receiver;

b) displaying, responsive to the successful authentication, the successful authentication to a payment transmitter located in the motor vehicle, wherein the display of the successful authentication is only performed for the successful authentication; and c) transmitting, responsive to the successful authentication, the receiver address and the transaction data to the cryptocurrency computer network.

2. The method of claim 1, wherein the successful authentication is optically or acoustically displayed to the payment transmitter located in the motor vehicle by a display device arranged in the motor vehicle.

3. The method of claim 1, further comprising:

a1) providing the transaction data to the payment transmitter located in the motor vehicle, wherein the transaction data comprises the receiver address, wherein step a1) is performed after step a).

4. The method of claim 3, wherein the transaction data provided in step a1) additionally comprises a payment amount or a transmitter address and a private key belonging to the transmitter address.

5. The method of claim 3, further comprising:

a2) at least partially entering the transaction data provided in step a1) into a transaction device in the motor vehicle, wherein step a2) is performed prior to step a).

6. The method of claim 5, wherein in step a2)

the transaction data is entered wirelessly and at least partially automatically without prompting by the payment transmitter, the transaction data is entered at least partially by the payment transmitter by an input device, connected to the transaction device, of the motor vehicle; or the transaction data is entered at least partially by scanning a QR code representation using an image capturing device connected to the transaction device, wherein the image capturing device is arranged on the motor vehicle or is arranged on a mobile terminal connected to the image capturing device.

7. The method of claim 5, wherein the transaction data entered in step a2) is at least partially stored in a database connected to the transaction device, on a removable storage device connected to the transaction device, wherein the removable storage device is a hardware wallet, or on at least one backend server connected to the transaction device.

8. The method of claim 4, wherein the private key is stored in a protected manner, such that the private key is recognizable only the payment transmitter.

9. The method of claim 3, wherein in step c), the transaction data entered in step a2) is at least partially transmitted from
a database to the cryptocurrency computer network,
a removable storage device, which is a hardware wallet, to the cryptocurrency computer network,
at least one backend server to the cryptocurrency computer network.

10. The method of claim 3, further comprising:
d) entering a transaction compiled from the transaction data into at least one account book of the cryptocurrency computer network.

11. The method of claim 10, further comprising:
e) transmitting a transaction status relating to the entered transaction to the payment transmitter located in the motor vehicle.

12. The method of claim 11, wherein in step e), the transaction status of the entry of the transaction is transmitted to the payment transmitter
after the cryptocurrency computer network confirms that the payment is a concluded payment, or
as early as ten minutes after the initiation of the transmission of the transfer of the transaction data to the cryptocurrency computer network.

13. A motor vehicle, comprising:
a payment transmitter; and
a transaction device coupled to the payment transmitter, wherein the motor vehicle or the transaction device are configured to
receive a receiver address of a payment receiver;
store the receiver address in a database of the motor vehicle;
determine whether the receiver address stored in the database has been previously authenticated,
wherein when the receiver address stored in the database has been previously authenticated, the receiver address and transaction data are transmitted to the cryptocurrency computer network without re-authentication, wherein the transaction data relates to the payment;
wherein when the receiver address stored in the database has not been previously authenticated, the motor vehicle or the transaction device are further configured to
a) authenticate, with a central evaluation unit external to the motor vehicle, the receiver address, wherein the authentication of the receiver address is a successful authentication if the receiver address is classified as authentic by the payment receiver;
b) display, responsive to the successful authentication, the successful authentication to a payment transmitter located in the motor vehicle, wherein the display of the successful authentication is only performed for the successful authentication; and
c) transmit, responsive to the successful authentication, the receiver address and the transaction data to the cryptocurrency computer network.

14. The motor vehicle of claim 13, further comprising:
an input device for entering the transaction data, or
an image capturing device arranged on the motor vehicle for entering transaction data.

15. A method for making a payment in a motor vehicle using a transaction on a cryptocurrency computer network, the method comprising:
capturing, by a camera of the motor vehicle, a QR code displayed on a payment receiver device of a payment receiver, wherein the QR code is a representation of a receiver address of the payment receiver;
determining, by the motor vehicle, whether the receiver address has been previously authenticated,
wherein when the receiver address has been previously authenticated, the motor vehicle transmits the receiver address and transaction data to the cryptocurrency computer network without re-authentication, wherein the transaction data relates to the payment;
wherein when the receiver address stored in the database has not been previously authenticated, the method further comprising
transmitting, by the motor vehicle to a central evaluation unit external to the motor vehicle, a request to authenticate the receiver address;
receiving, by the motor vehicle from the central evaluation unit, a response to the authentication request; and
transmitting, responsive to the response being a successful authentication, the receiver address and transaction data to the cryptocurrency computer network,
wherein, when the response is a successful authentication, the successful authentication is displayed by the payment receiver.

16. The method of claim 15, wherein the transaction data transmitted to the cryptocurrency computer network includes a payment amount.

17. The method of claim 15, wherein the payment amount is automatically received by the motor vehicle without manual input or prompting a driver of the motor vehicle.

18. The method of claim 17, wherein the payment amount is wirelessly received by the motor vehicle.

* * * * *